United States Patent [19]

Carter

[11] 4,013,224
[45] Mar. 22, 1977

[54] MATERIAL SPREADER

[75] Inventor: Thomas M. Carter, Wayzata, Minn.

[73] Assignee: Veda Inc., Long Lake, Minn.

[22] Filed: Sept. 22, 1975

[21] Appl. No.: 615,478

[52] U.S. Cl. .............................. 239/148; 239/172; 239/521; 239/675; 239/651; 210/172; 220/1 B; 222/176

[51] Int. Cl.² .................... B05B 9/04; A01C 15/00; A01C 23/00

[58] Field of Search .......... 239/146, 172, 148, 650, 239/651, 662, 672, 675, 676, 456, 513, 517, 518, 521, 524, 687; 222/176, 178; 210/241, 172; 220/1 B

[56] References Cited

UNITED STATES PATENTS

| | | | |
|---|---|---|---|
| 489,780 | 1/1893 | Albinson | 210/172 X |
| 493,965 | 3/1893 | Bowman | 210/172 |
| 1,156,327 | 10/1915 | Stiers | 239/521 |
| 1,708,987 | 4/1929 | Jaeger | 220/1 B X |
| 2,336,851 | 12/1943 | Bellis | 239/148 |
| 3,420,452 | 1/1969 | Vaughan | 239/675 X |
| 3,478,970 | 11/1969 | Siwersson et al. | 239/675 X |
| 3,490,698 | 1/1970 | Irving et al. | 239/675 X |
| 3,528,612 | 9/1970 | Van Der Lely | 239/172 |
| 3,858,809 | 1/1975 | Luthman et al. | 239/687 X |
| 3,871,588 | 3/1975 | Long et al. | 239/675 X |
| 3,905,523 | 9/1975 | Ahlers et al. | 239/172 X |

FOREIGN PATENTS OR APPLICATIONS

| | | | |
|---|---|---|---|
| 6,617,749 | 6/1968 | Netherlands | 239/172 |
| 1,142,013 | 2/1969 | United Kingdom | 239/172 |

*Primary Examiner*—Robert S. Ward, Jr.
*Attorney, Agent, or Firm*—Burd, Braddock & Bartz

[57] ABSTRACT

A liquid manure spreader having a tank for carrying liquid manure. An auger assembly driven by a power takeoff from a tractor delivers the manure to a pump mounted on the back of the tank. The pump discharges the material through a spreading structure. A valve operated by a hydraulic cylinder controls the flow of manure from the pump to the spreading structure. The spreading structure has a horizontal plate that directs the material in a wide, relatively low spread pattern onto the ground. The tank has a fill hole equipped with a safety grid assembly.

34 Claims, 6 Drawing Figures

U.S. Patent    Mar. 22, 1977    Sheet 1 of 2    4,013,224
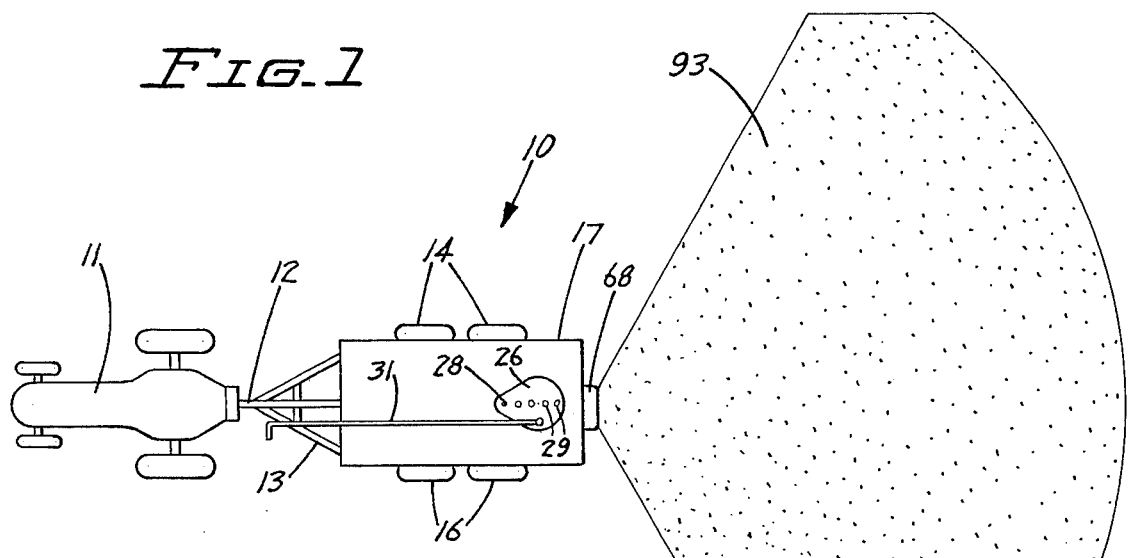
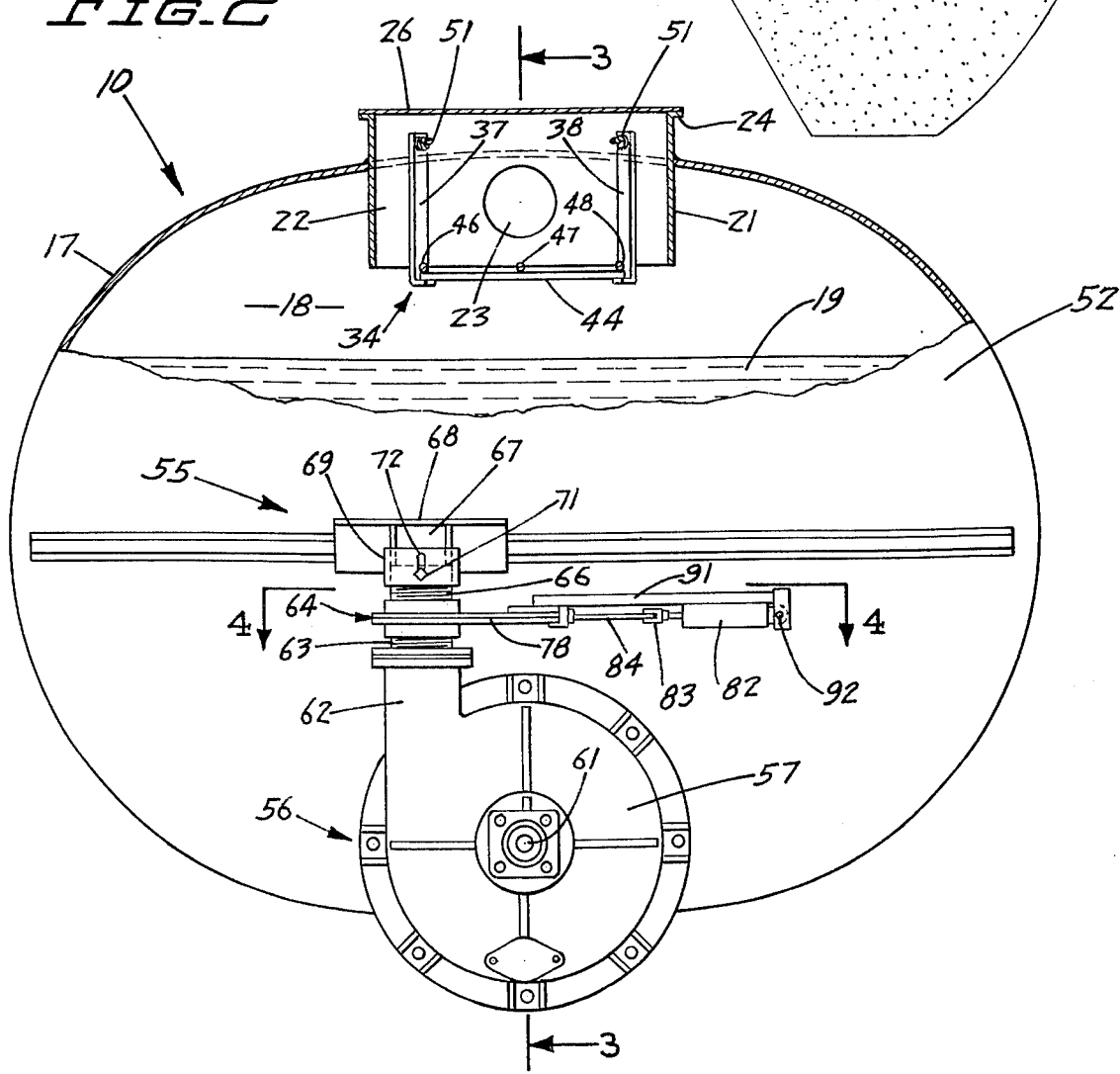

U.S. Patent    Mar. 22, 1977    Sheet 2 of 2    4,013,224
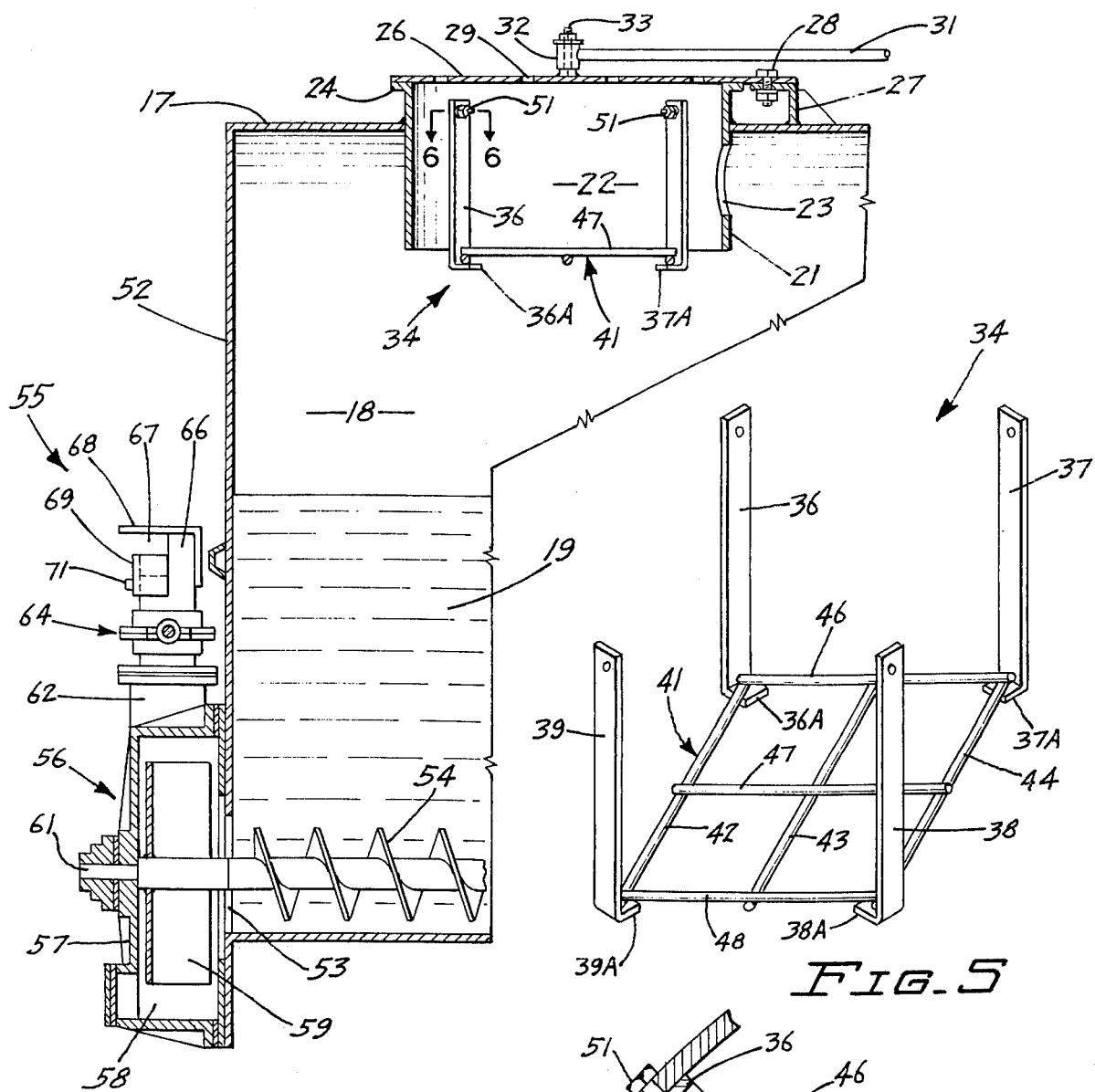
FIG_3    FIG_5    FIG_6
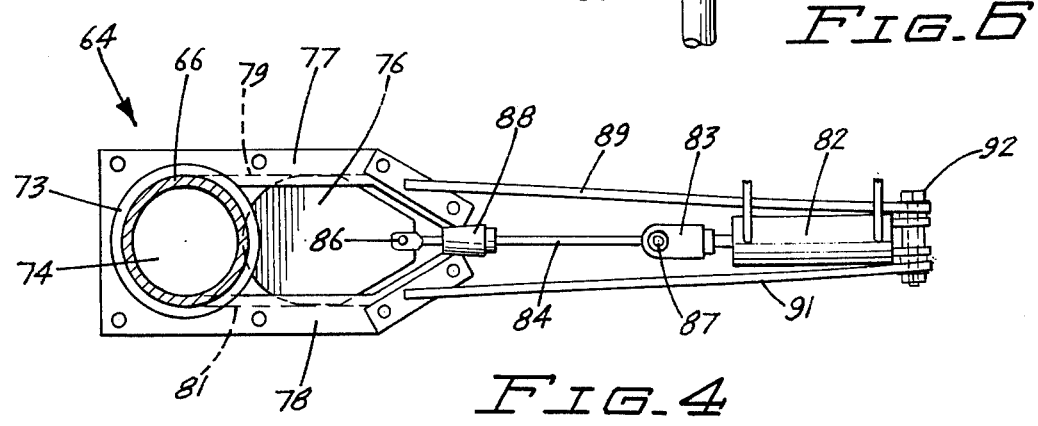
FIG_4

MATERIAL SPREADER

BACKGROUND OF INVENTION

Liquid manure has been handled in various ways to insure maximum utility of the manure and minimum waste and runoff. One system of handling liquid manure is to store the manure in tanks or lagoons until it is spread on agricultural land. The manure is pumped with power driven pumping machines from the tanks or lagoons into spreading machines. These machines have transport tanks with fill openings which are relatively large to permit a large volume of material to be discharged into the tanks. The openings are sufficiently large to allow the operator to enter the tank as well as permit large objects and bulk materials to enter the tank. The operator can also accidentally fall into the tank through the large inlet opening. When large solid objects, as rocks, bones, lumber, hard solid manure, frozen liquid manure and the like, are allowed to enter the tank chamber, the pumps, augers, valves and nozzles of the machine will become clogged and inoperative. The machine may be damaged by the solid objects, thereby requiring costly repairs. In use, the tank chamber accummulates noxious gases emitted by the manure which can be fatal to humans. In order to service, clean and repair the machines, operators often enter the tank chamber without adequate protection from the gases in the chamber. This results in a hazard to human health.

The tanks have pumping units operable to remove the manure from the tank and discharge the manure onto a desired location. Some tanks are provided with pumps which supply air under pressure to the tank whereby the manure in the tank is subjected to pressure to force the manure through a discharge nozzle onto the desired location. The discharge structures have manually operated valves in the discharge line which are open prior to spreading the manure. The valves are manually closed when the spreading is terminated. Examples of liquid manure spreading machines are shown in U.S. Pat. Nos. 3,420,452 and 3,528,612.

SUMMARY OF INVENTION

The invention relates to an apparatus for spreading liquid and particulate materials, as liquid manure, liquid fertilizers, herbicides, insecticides, and the like, onto a selected location, such as an agricultural field or pasture. More particularly, the invention is directed to a safety grid assembly located in a fill opening of a tank mateial spreader which prevents large objects, including the operator, from entering the tank chamber and prevents the operator from accidentally falling into the tank. The apparatus has a tank for carrying liquid manure. The tank has a cylindrical wall defining a fill hole used to deposit or pump liquid material into the tank chamber. A safety grid assembly is attached to the cylindrical wall to prevent inadvertent entrance of large objects, as rocks, lumber, bones, solid manure and other solid materials, into the tank chamber. The grid assembly also prevents the operator from entering the tank chamber and accidentally falling into the tank chamber which can have noxious and fatal gases and liquid materials.

A slinger assembly is mounted on a pump secured to the tank. The pump operates to remove the manure from the tank chamber and deliver the material under pressure to the slinger assembly. The manure is discharged through the slinger assembly into a relatively low, generally horizontal spread pattern onto the desired location. The slinger assembly is mounted on a valve assembly used to control the flow of manure from the pump to the slinger assembly. The valve assembly has a movable gate operable to open and close the opening of the valve assembly. A power unit, as a hydraulic cylinder, is operable to selectively open and close the gate. Arm structure supports the hydraulic cylinder on the valve assembly. The manure is delivered to the pump with an auger located along the bottom of the tank chamber. The auger operates to continuously mix the manure in the tank and provide a constant feed of manure to the pump.

An object of the invention is to provide a material holding tank with a safety grid structure which prevents an operator from entering the tank, prevents the operator from accidentally falling into the tank, prevents large objects from being placed into the tank, and protects structures, as augers and pumps that are located in the tank chamber or connected to the tank chamber. Another object of the invention is to provide a grid assembly for the fill hole structure of a liquid manure tank which does not interfere with the placing of liquid manure into the tank chamber and prevents the operator from entering the tank chamber. A further object of the invention is to provide a grid assembly adapted to be placed into the fill holes of tank spreaders of different makes and designs whereby the grid assembly is versatile in use. A further object of the invention is to provide a safety grid assembly for a liquid manure tank spreader that is relatively low-cost, simple in construction and safe and effective in use. Another object of the invention is to provide a material spreading apparatus with a valve assembly in the material dischage structure of the apparatus that is operated with a power unit. Yet another object of the invention is to provide a power driven valve assembly for a liquid manure spreader that is relatively simple in design, dependable in use, and operates with a minimum of maintenance over a long period of time.

IN THE DRAWINGS

FIG. 1 is a diagrammatic plan view of the material spreading apparatus of the invention showing the center spread swath behind the apparatus;

FIG. 2 is an enlarged rear elevational view, partly sectioned, of the material spreading apparatus of FIG. 1;

FIG. 3 is an enlarged sectional view taken along line 3—3 of FIG. 2 showing the rear portion of the material spreading apparatus;

FIG. 4 is an enlarged sectional view taken along line 4—4 of FIG. 2;

FIG. 5 is a perspective view of the safety grid assembly shown in FIG. 3; and

FIG. 6 is an enlarged sectional view taken along line 6—6 of FIG. 3.

DESCRIPTION OF PREFERRED EMBODIMENT

Referring to FIG. 1, there is shown a spreader apparatus of the invention indicated generally at 10 being moved over a location, as an agricultural field, by a towing tractor 11. A conventional power takeoff drive 12 drivably couples the power takeoff of the tractor 11 to the spreader apparatus 10 to operate the material mixing and pumping structure hereinafter described. Apparatus 10 has a frame 13 attached to walking beam assemblies (not shown). Side tandem wheels 14 and 16 are rotatably mounted on the walking beam assemblies to support the apparatus on the ground. An elongated material holding tank 17 is mounted on top of frame 13. Tank 17 has an interior chamber 18 for accommodating liquid and semi-liquid material 19, as liquid manure and like particulate and liquid materials. Material 19 can be mixtures of liquids and liquids mixed with solids. These mixtures can include manure, fertilizers, herbicides, insecticides, water, oil, industrial sludge, sanitary disposable products and others. The apparatus 10 is hereinafter described as used to spread liquid manure. Apparatus 10 is usable to spread other materials.

As shown in FIGS. 2 and 3, an upright cylindrical wall or tubular member 21 extends through a hole in the top of the back portion of tank 17 providing a passage or fill hole 22 into chamber 18. Wall 21 is welded to the top of tank 17 and has a first lower portion that extends down into chamber 18 and a second upper portion that projects above the top of tank 17. A hole 23 is located in the lower portion of wall 21 providing access between the fill hole 22 and the top of chamber 18. The top of wall 21 has an annular outwardly directed lip 24 having a top surface engageable by a generally flat plate-like cover 26.

As shown in FIG. 3, cover 26 is pivotally connected to an angle bracket 27 secured to the top of tank 17 forward of wall 21. An upright nut and bolt assembly 28 pivotally secures a portion of the cover 26 to bracket 27 whereby the cover can laterally swing away from the top of wall 21 and thereby open the fill hole 22. The cover 26 has a plurality of air holes 29 which permit air to flow into the tank during removal of the material 19 from the tank chamber 18. Cover 26 can be opened by the operator of the tractor 11. An elongated forwardly projected control rod 31 extends from cover 26 to the rear of tractor 11, as shown in FIG. 1. The control rod 31 is secured to an upright sleeve 32. As shown in FIG. 3, sleeve 32 is mounted on an upright bolt 33. The head of bolt 33 is secured by welds or the like to a side portion of cover 26.

The fill hole 22 has a relatively large diameter, preferably 24 inches, to permit a large amount of material to be introduced or pumped into the chamber 18. Power driven pumps are used to move material from pits and storage areas into the chamber 18. An example of this type of pump is shown in U.S. application Ser. No. 489,259. The material can be moved with a conveyor which discharges the material into fill hole 22. For example, a barn cleaner conveyor can carry fresh manure to fill hole 22.

A safety grid assembly or open grid means indicated generally at 34 is located across fill hole 22 to prevent the operator, other people or animals from entering the tank and prevent large objects, as rocks, lumber or hard portions of manure and the like, from entering the chamber 18. The chamber 18, being enclosed except for fill hole 22, accummulates noxious gases derived from the material 19. It is essential that the operator be prevented from entering chamber 18 as the gases are hazardous and may be fatal to the operator. Also, if there is material in the tank chamber 18, the operator could drown in the material. During the filling of the tank, it is desirable to rotate the auger 54 to mix the material and liquid in the tank. Safety grid assembly 34 prevents the operator from falling into the tank chamber 18 and being caught and injured by the rotating auger.

As shown in FIG. 5, safety grid assembly 34 has four downwardly extended legs or bars 36, 37, 38 and 39. The legs 36, 37, 38 and 39, have lower ends with inwardly directed feet 36A, 37A, 38 A and 39A, respectively. The feet 36A, 37A, 38A and 39A are located slightly below the lower edge of the cylindrical wall 21. A rectangular grid indicated generally at 41 is secured to the feet by welds or the like. Grid 41 has three lower bars or rods 42, 43 and 44. The opposite ends of bar 42 are secured by welds or the like to feet 36A and 39A. In a similar manner, the opposite ends of bar 44 are secured by welds or the like to feet 37A and 38A. Three top bars 46, 47 and 48 are secured by welds or the like to the top of bars 42, 43 and 44 to provide a generally rectangular grid structure. The grid 41 is in the nature of an open screen or large sieve having relatively large openings which permit the fluid-like material, such as liquid manure, to flow into chamber 18. The grid 41 prevents large objects as well as the operator of the machine from passing through fill hole 22 into chamber 18.

As shown in FIG. 6, the upper end of leg 36 has a hole accommodating a nut and bolt assembly 51. Nut and bolt assembly 51 passes through a hole in wall 21 to secure the leg 36 to the wall 21. Leg 36 is located adjacent the inside surface of wall 21. Legs 37, 38 and 39 are secured with separate nut and bolt assemblies to the separate portions of wall 21. Legs 36, 37, 38 and 39 extend downwardly into chamber 18 a short distance below the lower edge of wall 21. This locates grid 41 adjacent the lower edge of wall 21. This position of the grid 41 permits wall 21 to be utilized as a fill tube as the screening of grid 41 is achieved at the bottom of wall 21. With legs 36, 37, 38 and 39 located next to the inside surface of the wall 21 and grid 41 at the bottom of wall 21, the entire grid assembly 34 provides a minimum of obstruction to the movement of material into chamber 18.

As shown in FIGS. 2 and 3, tank 17 has an upright rear wall 52. The lower portion of wall 52 has an outlet opening 53 aligned with an auger 54. Auger 54 extends along the bottom of chamber 18 and is connected to the power takeoff drive 12. An example of the structure for mounting the auger on the tank and locating the auger along the bottom of the tank is shown in U.S. patent application Ser. No. 578,385. The subject matter of this application is incorporated herein by reference.

A pump indicted generally at 56 is secured to the bottom of back wall 52 and functions to receive the material 19 and discharge the material as a continuous stream under pressure to a spreading assembly 55 operable to discharge the material onto a location, as a field. Pump 56 has a housing 57 surrounding a pump chamber 58. A rotatable impeller 59 is located in chamber 58. Impeller 59 is secured to a shaft 61. A portion of the shaft 61 is rotatably mounted on housing 57. A second portion of shaft 61 is drivably secured to the end of auger 54 whereby rotation of auger 54 will rotate the impeller 59. Housing 57 has an upright tubular outlet member 62. A short tubular pipe or nipple 63 is secured to the top of member 62.

A valve assembly indicated generally at 64 secured to nipple 63 controls the flow of material from the pump 56 to spreading assembly 55. The material spreading assembly 55 is mounted on the valve assembly 64 for spreading the material in a generally low profile, even spread pattern behind the spreader apparatus, as shown in FIG. 1.

The spreading assembly 55 comprises an upright tubular member or pipe 66 having a rear cutout or semicircular discharge opening 67. A deflector plate 68 having a flat, horizontal portion is secured by welds or the like to the top of pipe 66. Opposite portions of deflector plate 68 project laterally from pipe 66. A semicircular member 69 is vertically adjustable to adjust the size of the discharge opening 67. A bolt 71 secures the member 69 to pipe 66. Member 69 has an upright slot 72 permitting vertical adjustment of the member 69 on pipe 66 and thereby provide for the adjustment of the height of the discharge opening 67. The spreading structure 55 is disclosed in U.S. patent application Ser. No. 578,385. The spreading assembly of this application is incorporated herein by reference.

Valve assembly 64 shown in FIG. 4 has a casing 73 with a passage aligned with the passages of nipple 63 and pipe 66. A generally flat gate or door 76 is movable between open and closed positions to control the flow of material through passage 74. As shown in FIG. 4, the gate 76 is in the open position. A pair of plates 77 and 78 project laterally from casing 73. The plates 77 and 78 have linear guideways or grooves 79 and 81 for accommodating opposite edges of the gate 76 whereby the gate can slide between its open and closed positions on plates 77 and 78. A power unit 82, as a double acting hydraulic cylinder or air cylinder, is used to control the position of gate 76. Power unit 82 is connected to a source of hydraulic pressure with suitable lines and valves (not shown), as the hydraulic system of tractor 11. Power unit 82 has a movable piston rod 83 connected to a link 84. A clevis and pin structure 86 connects one end of link 84 to gate 76. A pivot pin 87 connects the opposite end of link 84 to piston rod 83. A portion of link 84 extends through a sleeve or guide collar 88 secured to the forward ends of plates 77 and 78. The power unit 82 is secured to plates 77 and 78 with a pair of laterally directed arms 89 and 91. Arms 89 and 91 have ends secured to plates 77 and 78, respectively. The opposite ends of arms 89 and 91 have short downwardly directed portions accommodating a nut and bolt assembly 92. The nut and bolt assembly 92 secures the outer end of the power unit 82 to arms 89 and 91.

In use, the material, as liquid manure, is pumped into chamber 18 through the fill hole 22. The grid 41 functions as a screen or sieve to prevent large objects from entering the tank chamber 18. The tank can be filled with the material. The upper portion of the tank is filled via opening 23 since the cylindrical wall extends down into chamber 18. The downward extension of cylindrical wall 21 prevents the liquid material in the tank from spilling out of the fill hole 22 during transportation of the tank to the spreading location. When the tank is filled, the cover 26 is moved to the closed position and the apparatus 10 is towed to the spreading location. At the spreading location, the valve assembly 64 is opened. Power unit 82 is actuated to pull gate 76 to the open position. This opens the passage 74. The power takeoff of the tractor is engaged, thereby driving auger 54 and impeller 59. Material 19 is moved from tank chamber 18 through outlet opening 53 into the pump chamber 58. The rotating impeller 59 pumps the material as a continuous stream under pressure through the outlet member 62 to the spreading structure. The material is deflected by the horizontal deflector plate 68 into a relatively low, wide and even spread pattern 93, as shown in FIG. 1. The valve gate 76 remains open during the spreading operation. When the spreading operation is completed, the power unit 82 is actuated whereby the gate 76 is forced to its closed position, thereby closing opening 74.

Safety grid assembly 34 is usable in other types of material spreading machines having tanks with fill holes. Grid assembly 34 can be mounted on the dome of the tank disclosed in U.S. application Ser. No. 500,133 or the dome of the tank in U.S. Pat. No. 3,528,612.

While there has been shown and described a preferred embodiment of the invention, it is understood that changes in the structure and material may be made by those skilled in the art without departing from the spirit of the invention.

The embodiments of the invention in which an exclusive property or privilege is claimed are defined as follows:

1. An apparatus for spreading material, as liquid manure, onto a location comprising: a tank having a top wall and a chamber for holding material, wheel means for supporting the tank whereby the tank can be moved over the ground, an upright tubular wall secured to the top wall of the tank, said tubular wall having a portion extended down from the top wall into the chamber and a passage open at one end to the chamber and open at the other end outside of the tank whereby material can be placed in the chamber through said passage, said portion having a lower edge located below the top wall, open grid means secured to the tubular member and extended across said passage in general alignment with the lower edge of the portion of the tubular wall operable to prevent large objects from being placed in the chamber, fastening means for connecting the open grid means to the tubular wall, and means for removing material from the chamber and spreading the material onto a location.

2. The apparatus of claim 1 wherein: said means for removing the material from the chamber and spreading the material onto a location includes a pump mounted on the tank, said pump having a material discharge outlet, a valve assembly mounted on said material discharge outlet, power means mounted on the valve assembly operable to open and close the valve assembly, and a spreading assembly mounted on said valve assembly for receiving material flowing through the valve assembly and spreading the material onto a location.

3. The apparatus of claim 1 wherein: the open grid means includes a plurality of legs attached to the grid structure, said fastening means attaching the legs to the tubular wall.

4. The apparatus of claim 1 wherein: said open grid means includes a plurality of generally upright legs and grid structure secured to lower portions of the legs.

5. The apparatus of claim 4 wherein: the grid structure comprises a plurality of spaced side-by-side first rods and a plurality of spaced side-by-side second rods, said second rods being normally disposed relative to the first rods.

6. The apparatus of claim 4 wherein: each leg has an inwardly directed foot at the end thereof, said grid structure being secured to each foot.

7. An apparatus for spreading material, as liquid manure, onto a location comprising: a tank having a top wall and a chamber for holding material, wheel means for supporting the tank whereby the tank can be moved over the ground, an upright tubular wall secured to the top wall of the tank, said tubular wall has a first portion extended down from the top wall into the chamber and a second portion projected upwardly from the top wall, said first portion having a lower edge located below the top wall, said tubular wall having a passage open at one end to the chamber and open to the other end outside the tank whereby material can be placed in the chamber through said passage, open grid means secured to the tubular member and extended across that passage operable to prevent large objects from being placed in the chamber, said open grid means having grid structure located generally in alignment with the lower edge across the lower open end of the passage, and a plurality of generally upright legs, said grid structure being secured to lower portions of the legs, said legs having upper ends located adjacent said second portion of the tubular wall, and means attaching said upper ends of the legs to the second portion of the tubular wall, and means for removing material from the chamber and spreading the material onto a location.

8. The apparatus of claim 7 wherein: the grid structure comprises a plurality of spaced side-by-side first rods and a plurality of spaced side-by-side second rods, said second rods being normally disposed relative to the first rods.

9. The apparatus of claim 7 wherein: each leg has an inwardly directed foot at the lower end thereof, said grid structure being secured to each foot.

10. The apparatus of claim 7 including: cover means adapted to close the upper end of the passage.

11. The apparatus of claim 7 wherein: said means for removing the material from the chamber and spreading the material onto a location includes a pump mounted on the tank, said pump having a material discharge outlet, a valve assembly mounted on said material discharge outlet, power means mounted on the valve assembly operable to open and close the valve assembly, and a spreading assembly mounted on said valve assembly for receiving material flowing through the valve assembly and spreading the material onto a location.

12. The apparatus of claim 11 including: arm means extended from the valve assembly and means attaching the power means to the arm means.

13. The apparatus of claim 11 wherein: said power means is a double acting fluid cylinder.

14. An apparatus for carrying material, as liquids, semi-liquids, particulate matter and the like, comprising: a tank having a top wall and a chamber for holding material, a tubular wall secured to the top wall of the tank, said tubular wall having a lower end open to the chamber and a passage open at the lower end to the chamber and open at the other end outside of the tank whereby material can be placed in the chamber through said pssage, open grid means extended across said passage in general alignment with the lower end of the tubular wall operable to prevent large objects from being placed in the chamber, and fastening means for connecting the open grid means to the tubular wall.

15. The apparatus of claim 14 wherein: said tubular wall having a first portion extended down from the top wall into the chamber and a second portion extended upwardly from the top wall, said first portion having a lower edge located below the top wall, said open grid means having grid structure located generally in alignment with the lower edge across the lower open end of the passage, said fastening means securing the open grid means to the second portion of the tubular member.

16. The apparatus of claim 15 wherein: the open grid means includes a plurality of legs attached to the grid structure, said fastening means attaching the legs to the second portion of the tubular wall.

17. The apparatus of claim 14 wherein: said open grid means includes a plurality of generally upright legs and grid structure secured to lower portions of the legs.

18. The apparatus of claim 17 wherein: the grid structure comprises a plurality of spaced side-by-side first rods and a plurality of spaced side-by-side second rods, said second rods being normally disposed relative to the first rods.

19. The apparatus of claim 17 wherein: each leg has an inwardly directed foot at the end thereof, said grid structure being secured to each foot.

20. An apparatus for carrying material, as liquids, semi-liquids, particulate matter and the like, comprising: a tank having a top wall and a chamber for holding material, a tubular wall secured to the top wall of the tank, said tubular wall having a first portion extended down from the top wall into the chamber and a second portion projected upwardly from the top wall, said first portion having a lower edge located below the top wall, said tubular wall having a passage open at one end to the chamber and open at the other end outside of the tank whereby material can be placed in the chamber through said passage, open grid means extended across said passage operable to prevent large objects from being placed in the chamber, said open grid means having grid structure located generally in alignment with the lower edge across the lower open end of the passage, and a plurality of generally upright legs, said grid structure being secured to lower portions of the legs, said legs having upper ends located adjacent said second portion of the tubular wall, and means attaching said upper ends of the legs to the second portion of the tubular wall.

21. The apparatus of claim 20 wherein: the grid structure comprises a plurality of spaced side-by-side first rods and a plurality of spaced side-by-side second rods, said second rods being normally disposed relative to he first rods.

22. The apparatus of claim 20 wherein: each leg has an inwardly directed foot at the lower end thereof, said grid structure being secured to each foot.

23. The apparatus of claim 20 including: cover means adapted to close the upper end of the passage.

24. A safety grid assembly for a tank having a material inlet opening comprising: open grid means adapted to cross the inlet opening operable to prevent large objects from being placed in the chamber, said open grid means including grid structure and means for attaching the grid structure to the tank, said grid structure having a plurality of spaced side-by-side first rods and a plurality of spaced side-by-side second rods, said second rods being normally disposed relative to the first rods, said first rods and second rods having outer rods with adjacent ends being secured to each other, a plurality of generally upright legs attached to the said adjacent ends of the first and second rods, said legs having upper ends provided with means usable to accommodate fastening means for attaching the legs to the tank.

25. The apparatus of claim 24 wherein: each leg has an inwardly directed foot at the lower end thereof, said grid structure being secured to each foot.

26. An apparatus for spreading material, as liquid manure, onto a location comprising: a tank having a chamber for holding material, and means for removing the material from the chamber and spreading the material onto a location, said means including a pump mounted on the tank, said pump having a material discharge outlet, a valve assembly mounted on said material discharge outlet, power means mounted on the valve assembly operable to open and close the valve assembly, and a spreading assembly mounted on said valve assembly for receiving material flowing through the valve assembly and spreading the material onto a location.

27. The apparatus of claim 26 including: arm means extended from the valve assembly, and means attaching the power means to the arm means.

28. The apparatus of claim 27 wherein: said power means is a double acting fluid cylinder.

29. The apparatus of claim 26 wherein: said valve assembly has a housing mounted on the pump outlet and a gate movably mounted on the housing to selectively open and close the valve assembly, a pair of laterally spaced arms secured to the valve assembly housing, said power unit comprising a double acting fluid cylinder having a movable piston rod, link means connecting the piston rod to the gate whereby operation of the fluid cylinder will move the gate between its open and closed positions, and means mounting the cylinder on said arms.

30. The apparatus of claim 29 including: sleeve means mounted on the housing for guiding the link means.

31. An apparatus for carrrying material, as liquids, semi-liquids, particulate matter and the like comprising: a tank having a top wall and a chamber for holding material, a generally upright tubular wall secured to the top wall of the tank, said tubular wall having an upper end open to the environment outside of the tank and a lower end open to the chamber and a passage in communication with the open upper end and the open lower end whereby material can be placed in the chamber through said passage, open grid means located in said passage substantially below the open end of the tubular wall, said grid means extending across said passage operable to prevent large objects from being placed in the chamber, and fastening means for connecting the open grid means to the tubular wall.

32. The apparatus of claim 31 wherein: said tubular wall has a first portion extended down from the top wall into the chamber and a second portion extended upwardly from the top of the wall, said first portion having a lower edge located below the top wall, said second portion having an upper edge located above the top of the wall, said fastening means securing the open grid means to the second portion of the tubular member.

33. The apparatus of claim 32 wherein: the open grid means includes a plurality of upright legs attached to the grid structure, said fastening means attaching the legs to the second portion of the tubular wall.

34. The apparatus of claim 33 wherein: said grid means includes a plurality of spaced side-by-side first rods and a plurality of spaced side-by-side second rods, said second rods being normally disposed relative to the first rods, said legs being attached to adjacent ends of the first and second rods.

* * * * *